United States Patent
Sachs et al.

(10) Patent No.: US 8,326,533 B2
(45) Date of Patent: Dec. 4, 2012

(54) APPARATUS AND METHODOLOGY FOR CALIBRATION OF A GYROSCOPE AND A COMPASS INCLUDED IN A HANDHELD DEVICE

(75) Inventors: David Sachs, Sunnyvale, CA (US); Shang-Hung Lin, San Jose, CA (US)

(73) Assignee: Invensense, Inc., Sunnyvale, CA (US)

( * ) Notice: Subject to any disclaimer, the term of this patent is extended or adjusted under 35 U.S.C. 154(b) by 354 days.

(21) Appl. No.: 12/691,710

(22) Filed: Jan. 21, 2010

(65) Prior Publication Data

US 2011/0178707 A1    Jul. 21, 2011

(51) Int. Cl.
*G01C 17/38* (2006.01)
*G01C 19/00* (2006.01)
*G01P 21/00* (2006.01)

(52) U.S. Cl. ............... 701/472; 702/85; 702/92; 702/93; 702/150; 702/151; 73/1.75; 73/1.76; 73/1.77

(58) Field of Classification Search ............ 701/200, 701/213, 214, 216, 220, 472, 508; 345/156; 455/456.3; 702/85, 92, 93, 150, 151; 73/1.75, 73/1.76, 1.77
See application file for complete search history.

(56) References Cited

U.S. PATENT DOCUMENTS

| | | | |
|---|---|---|---|
| 6,014,610 A | 1/2000 | Judge et al. | |
| 6,622,091 B2 * | 9/2003 | Perlmutter et al. | 701/472 |
| 7,031,728 B2 * | 4/2006 | Beyer, Jr. | 455/456.3 |
| 7,219,033 B2 * | 5/2007 | Kolen | 702/150 |
| 7,421,340 B2 * | 9/2008 | Ladetto et al. | 701/508 |
| 7,526,402 B2 * | 4/2009 | Tanenhaus et al. | 702/151 |
| 7,667,686 B2 * | 2/2010 | Suh | 345/156 |
| 7,689,378 B2 * | 3/2010 | Kolen | 702/150 |
| 8,108,171 B2 * | 1/2012 | Judd | 702/93 |
| 2005/0240347 A1 * | 10/2005 | Yang | 701/220 |
| 2008/0077326 A1 * | 3/2008 | Funk et al. | 701/220 |
| 2009/0254294 A1 | 10/2009 | Dutta | |
| 2010/0214216 A1 | 8/2010 | Nasiri et al. | |

OTHER PUBLICATIONS

International Search Report for PCT Patent Application No. PCT/US11/021772 dated Mar. 21, 2011, 13 pages.

* cited by examiner

*Primary Examiner* — Tuan C. To
*Assistant Examiner* — Dale W Hilgendorf
(74) *Attorney, Agent, or Firm* — Turocy & Watson, LLP (57) ABSTRACT

Techniques for estimating compass and gyroscope biases for handheld devices are disclosed. The compass bias can be determined by causing a small movement of the handheld device and comparing the data obtained from the compass with the data obtained from the gyroscope. The gyroscope bias can be determined by obtaining a quaternion based angular velocity term of the handheld device when the accelerometer and compass data are reliable, and then comparing the angular velocity term with the gyro data to estimate the gyro bias. When the compass and/or the accelerometer data are unreliable, a previously determined quaternion angular velocity term is used. The gyroscope bias can also be determined by measuring gyroscope biases at various temperatures in a non-factory setting, storing the data in a memory, and using the data to estimate gyro biases when the accelerometer and/or the compass data are unreliable.

19 Claims, 11 Drawing Sheets

APPARATUS AND METHODOLOGY FOR CALIBRATION OF A GYROSCOPE AND A COMPASS INCLUDED IN A HANDHELD DEVICE

FIELD OF THE INVENTION

The present invention relates to handheld devices, for example, a video game controller or a handheld navigation device, and particularly to the calibration of a gyroscope and a compass included in a handheld device.

BACKGROUND OF THE INVENTION

Compasses and accelerometers are being used in commercial products, particularly in video gaming, automotive and navigational systems. InvenSense Inc., the assignee of the present invention, is a pioneer in the field of using a combination of gyroscopes, accelerometers and compasses in handheld commercial devices such as wireless phones, video gaming systems, cameras, user authentication devices and other devices in which motion sensing is done. An accelerometer is used for measuring linear acceleration, a compass is used for determining direction relative to the earth's magnetic pole, and a gyroscope is used for measuring or maintaining orientation based on the Coriolis Effect.

Bias errors are associated with both compasses and gyroscopes. The bias error in a compass makes it difficult to determine earth's magnetic North pole. The bias offset of a gyroscope, also known as the null voltage, is the measured voltage when the gyro is not rotating about its sensitive axis. Gyro output voltage measurements above the bias offset indicate rotation in one direction (e.g., clockwise), while voltage measurements below the bias offset indicate rotation in the opposite direction (e.g., counter-clockwise). If the gyro bias offset is not corrected, it can result in a continuous drift.

Large bias errors are common in compasses due to the nature of low cost Hall sensor based compasses. The conventional method of calibrating a compass on the fly is to use the knowledge that, when all calibration parameters are found, the magnitudes of the X, Y, and Z compass measurements should always equal the same value, namely, the value of the magnetic field vector that the compass is measuring.

A least squares method (or other standard linear algebra method) can be used that solves the equation: $(X-Xbias)^2+(Y-Ybias)^2+(Z-Zbias)^2=M^2$, in which M is the magnitude of the magnetic field vector and $^2$ represents square (algebra). Conventionally, this equation is solved for Xbias, Ybias, and Zbias. A problem with this method is that it requires the user to move the device having the compass in a complex trajectory (e.g. a figure eight) in order for this method to have enough information to converge.

With respect to gyroscopes, conventionally, when a gyroscope is used in combination with an accelerometer and a compass, any offset in the gyroscope data can be compensated by the accelerometer in pitch and roll, and the compass in yaw. However, at times the compass and/or the accelerometer data can become unreliable. And because elimination of the offset error is instantaneous, the conventional method is only applicable with the accelerometer and compass data is reliable and is used. If, for example, the compass data becomes unreliable due to magnetic interference etc. or the accelerometer data becomes unreliable because of the presence of high linear accelerations, the compass data and/or the accelerometer data cannot be used. In that case, any existing gyro bias error would be uncompensated and result in a continuous drift.

SUMMARY OF THE INVENTION

The following presents a simplified summary of the subject disclosure in order to provide a basic understanding of some aspects thereof. This summary is not an extensive overview of the various embodiments of the subject disclosure. It is intended to neither identify key or critical elements nor delineate any scope. Its sole purpose is to present some concepts in a simplified form as a prelude to the more detailed description that is presented later.

The present invention relates to novel and efficient computer system and methodology for correcting biases for gyroscopes and accelerometers and compasses included in handheld devices including motion sensing applications, for example, wireless phones, video gaming systems, navigational devices and cameras. According to one aspect of the present invention, a handheld device is rotated through an angle. The rotation information received from the gyroscope is compared with the rotation information received from the compass, and the result of the comparison is used to determine the compass bias. An advantage of the present invention is that the compass bias can be determined by causing only a small movement of the handheld device. In conventional systems, which do not use the gyroscope data to determine the compass bias, a much larger trajectory of the handheld device is required to determine the compass bias.

According to another aspect of the present invention, rotation information received from a gyroscope, a compass and an accelerometer is used to determine a quaternion based angular velocity (AV) term. The quaternion AV term is compared with the gyro data to determine the gyro bias error. In situations in which the compass data and/or the gyroscope data are unreliable, quaternion based AV term is not determined. In those situations, a quaternion based AV term stored in a memory, which was previously determined when the compass and accelerometer data were reliable, is used for estimating a gyroscope bias This term can be used to estimate the gyro bias continuously, even when the device is not completely stationary or temperature is changing.

According to yet another aspect of the present invention, the handheld device is placed in a non-factory setting in which the handheld device is not subject to a strong linear acceleration and the handheld device is not subject to a rapidly changing magnetic field. In that setting, when the temperature changes, gyroscope biases at various temperature values are measured and stored in a database. The database is then used to estimate the gyroscope bias in situations in which the accelerometer and/or the compass data are unreliable.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION

The present invention related to systems and techniques for calibrating gyroscopes and compasses incorporated in handheld consumer electronic devices including, for example, remote controllers, cameras and wireless navigational devices. The claimed subject matter is now described with reference to the drawings, wherein like reference numerals are used to refer to like elements throughout. In the following description, for purposes of explanation, numerous specific details and examples are set forth in order to provide a thorough understanding of the subject innovation. One of ordinary skill in the art will understand, however, that the subject innovation may be practiced without these specific details and is not limited by these specific details and examples. One of ordinary skill in the art will also appreciate that well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" and "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

MEMS based motion sensors include an accelerometer, a compass and a gyroscope. One of ordinary skill in the art will appreciate that the present invention is not limited to MEMS based devices, that the MEMS based embodiments disclosed herein are exemplary, and that the present invention can be implemented with any accelerometer, compass and gyroscope that can be incorporated in a handheld device. One of ordinary skill in the art will appreciate that other types of inertial sensors that can be included in a handheld device, for example, quartz sensors, can also be used in the present invention. Other types of inertial sensors that include mechanical components on the micron or millimeter scale and can be combined with electronic circuitry can also be used in the present invention.

An accelerometer can be used to measure linear acceleration. The physical mechanisms underlying MEMS accelerometers include capacitive, piezoresistive, electromagnetic, piezoelectric, ferroelectric, optical and tunneling. MEMS based accelerometers can be simple devices consisting of a cantilever beam with a predetermined test mass (also known as proof mass seismic mass). Under the influence of external accelerations, the mass deflects from its neutral position. This deflection is measured in an analog or digital manner. Commonly, the capacitance between a set of fixed beams and a set of beams attached to the proof mass is measured.

Other types of MEMS based accelerometers can contain a small heater at the bottom of a very small dome, which heats the air inside the dome to cause it to rise. A thermocouple on the dome determined where the heated air reaches the dome and the deflection off the center is a measure of the acceleration applied to the sensor. MEMS based accelerometers generally operate in-plane, that is, they are designed to be sensitive only to a direction of the plane of the die. By integrating two devices perpendicularly on a single die a two-axis accelerometer can be made. By adding an additional out-of-plane device, three axes can be measured. Accelerometers with integral electronics offer readout electronics and self-test capability.

A compass is an instrument used for determining direction relative to the earth's magnetic pole. It consists of a magnetized pointer free to align itself with the earth's magnetic field. MEMS based compasses are usually built out of two or three magnetic field sensors that provide data for a microprocessor. The correct heading relative to the compass is calculated using trigonometry. Often, a MEMS based compass is a discrete component which outputs either a digital or analog signal proportional to its orientation. This signal is interpreted by a controller or microprocessor. The compass can use highly calibrated internal electronics to measure the response of the compass to the earth's magnetic field.

A gyroscope is a device used for measuring or maintaining orientation based on the Coriolis Effect. MEMS based gyroscopes use vibrating proof masses. Those masses typically vibrate at a high frequency. As the sensor housing rotates in inertial space a Coriolis force is induced on the proof mass. The Coriolis force causes a vibration in an orthogonal plane and the amplitude of the orthogonal motion can be measured. This type of device is also known as a Coriolis vibratory gyro because as the plane of oscillation is rotated, the response detected by the transducer results from the Coriolis term in its equations of motion ("Coriolis force"). A vibrating structure gyroscope can be implemented as a tuning fork resonator, a vibrating wheel or a wine glass resonator using MEMS technology.

FIGS. 1, 4-7 illustrate exemplary environments in which the present invention can be implemented. According to FIG. 1, the handheld consumer electronics device 100 of the present invention includes an integrated circuit chip (IC) 102 including the CMOS processing circuitry 106 coupled to the memory 104, the gyroscope 110, the compass 112 and the accelerometer 114. The CMOS processing circuitry 106 includes a microprocessor. According to FIG. 4, the handheld consumer electronics device 400 of the present invention includes the applications processor 420 coupled to the memory 404, the gyroscope IC 410, the compass IC 412 and the accelerometer IC 414.

Figure 5:
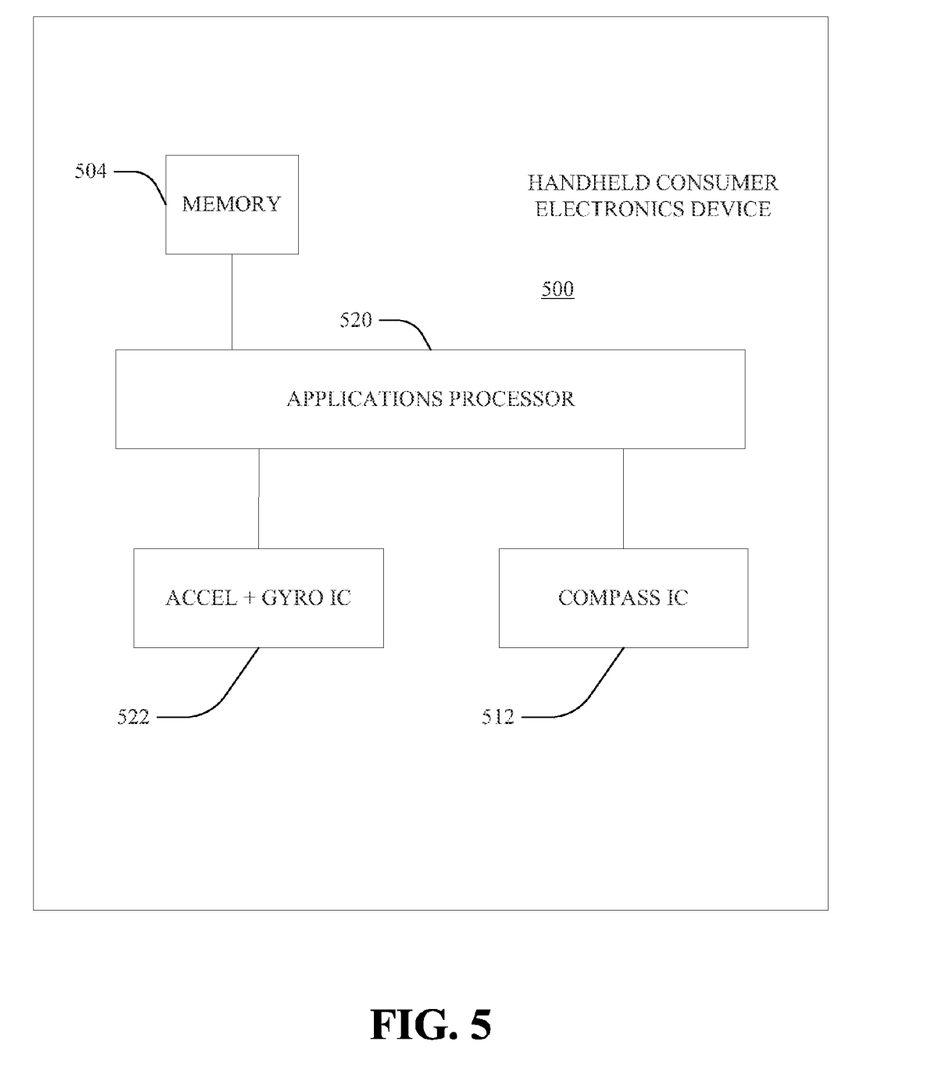
FIG. 5 illustrates an exemplary architecture of the present invention.
Figure 6:
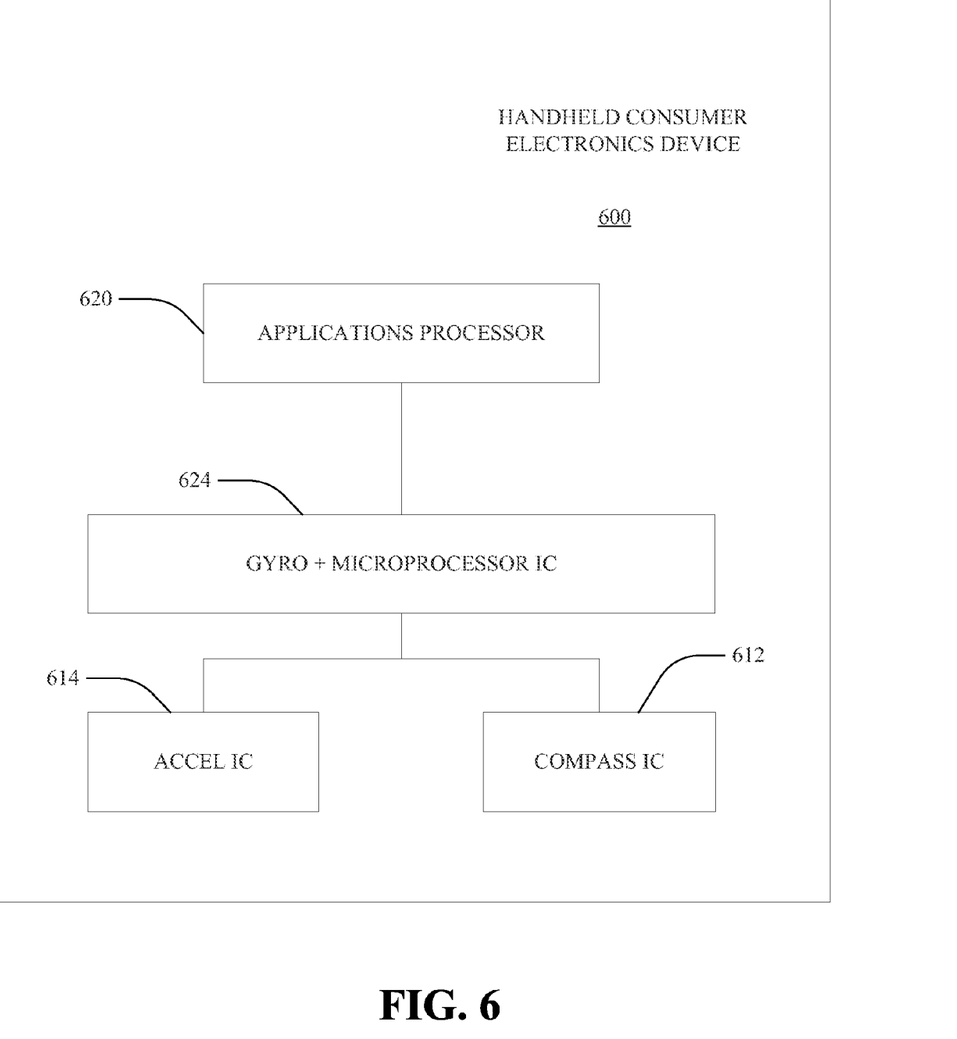
FIG. 6 illustrates an exemplary architecture of the present invention.
Figure 7:
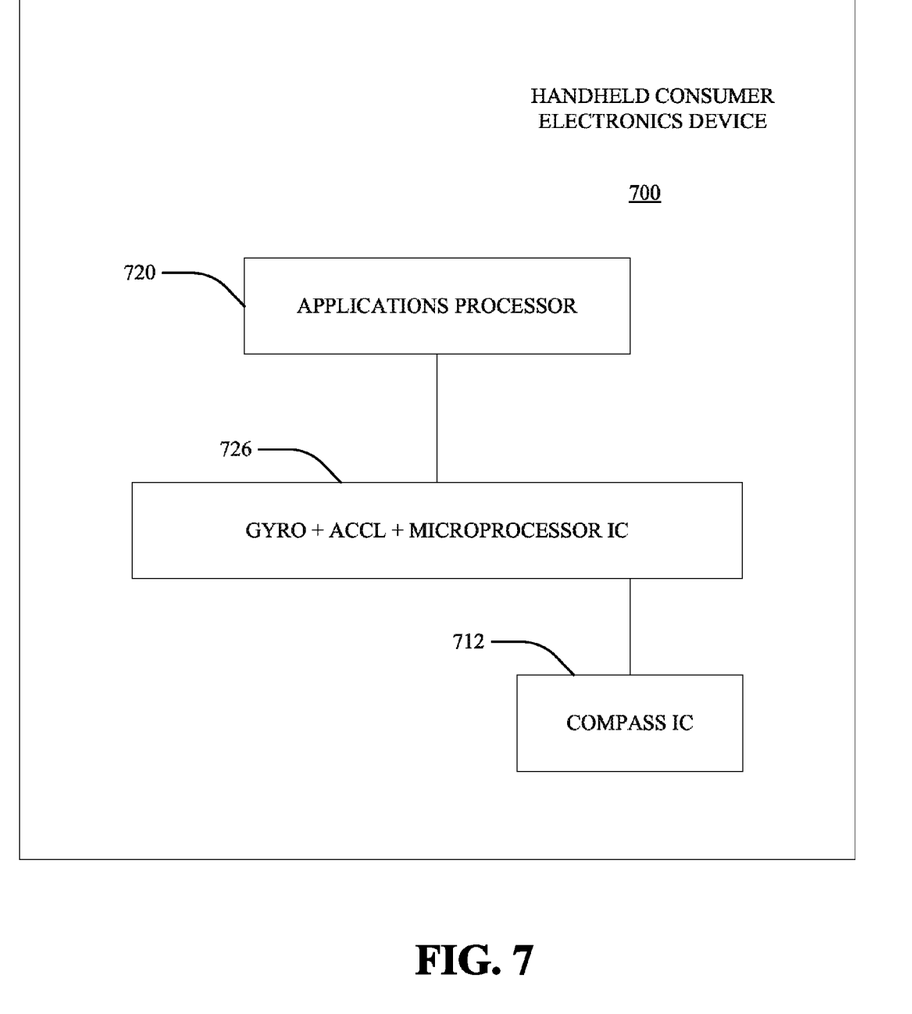
FIG. 7 illustrates an exemplary architecture of the present invention.

According to FIG. 5, the handheld consumer electronics device 500 of the present invention includes an IC 522 that includes both a gyroscope and an accelerometer. The applications processor 520 is coupled to the memory 504, the compass IC 512 and the IC 522 including the accelerometer and the gyroscope. According to FIG. 6, the handheld consumer electronics device 600 of the present invention includes an IC 624 that includes both a gyroscope and a microprocessor. The IC 624 is coupled to the applications processor 620, the compass IC 612 and the accelerometer IC 614. According to FIG. 7, the handheld consumer electronics device 700 of the present invention includes an IC 726 that includes a gyroscope, an accelerometer and a microprocessor. The IC 726 is coupled to the compass 712 and the applications processor 720.

Figure 8:
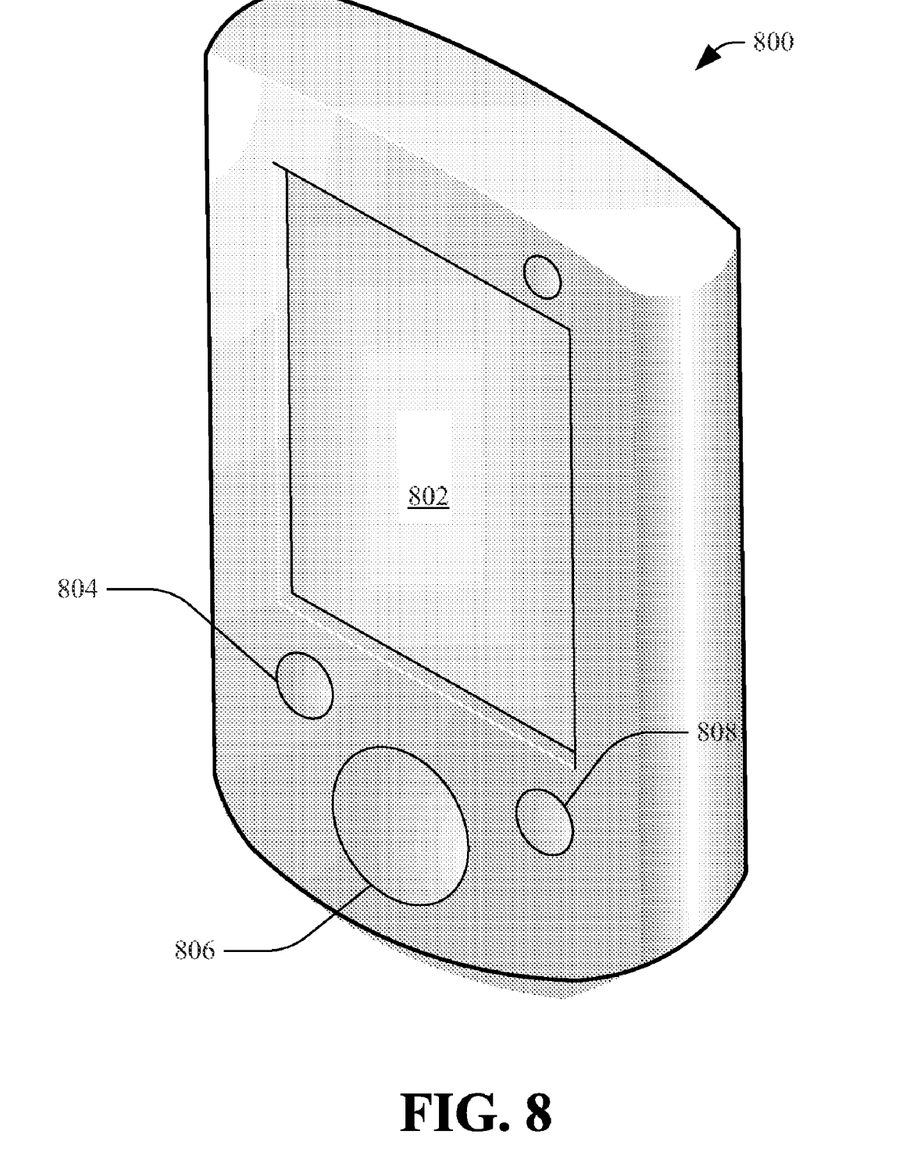
FIG. 8 illustrates an exemplary device in which the present invention can be implemented.

The exemplary arrangements discussed above with respect to FIGS. 1, 4-7 can be implemented in commercial handheld devices including video gaming systems, wireless phones with navigational capability, cameras and others. FIG. 8 illustrates an exemplary handheld device 800 of the present invention. In one embodiment, the device 800 can represent a video gaming system including a display 802 and buttons 804, 806 and 808. An exemplary game can include a car racing game. In this example, the user can control the direction of the car and the turns by moving the device 800, and can control the speed of the car by either using the buttons 804, 806 and 808, or by tilting the device toward or away from the user. The position of the user's car and other cars can be seen on the display 802 in real time.

In another embodiment, the device 800 can include a wireless phone coupled to a global positioning system (GPS) having navigational capability. The wireless phone 800 can also include an augmented reality capability, i.e. capability to provide a live direct or indirect view of a physical real-world environment whose elements are merged with (or augmented by) virtual computer-generated imagery—creating a mixed reality. So, as the user walks down a street, the display 802 can display the user's location in real time and also display the physical real world environment, for example, the restaurants and stores that are approaching. The user can also stand at an intersection and move the handheld device in various directions to see the various restaurants and stores available in various directions.

Compass Calibration

Figure 1:
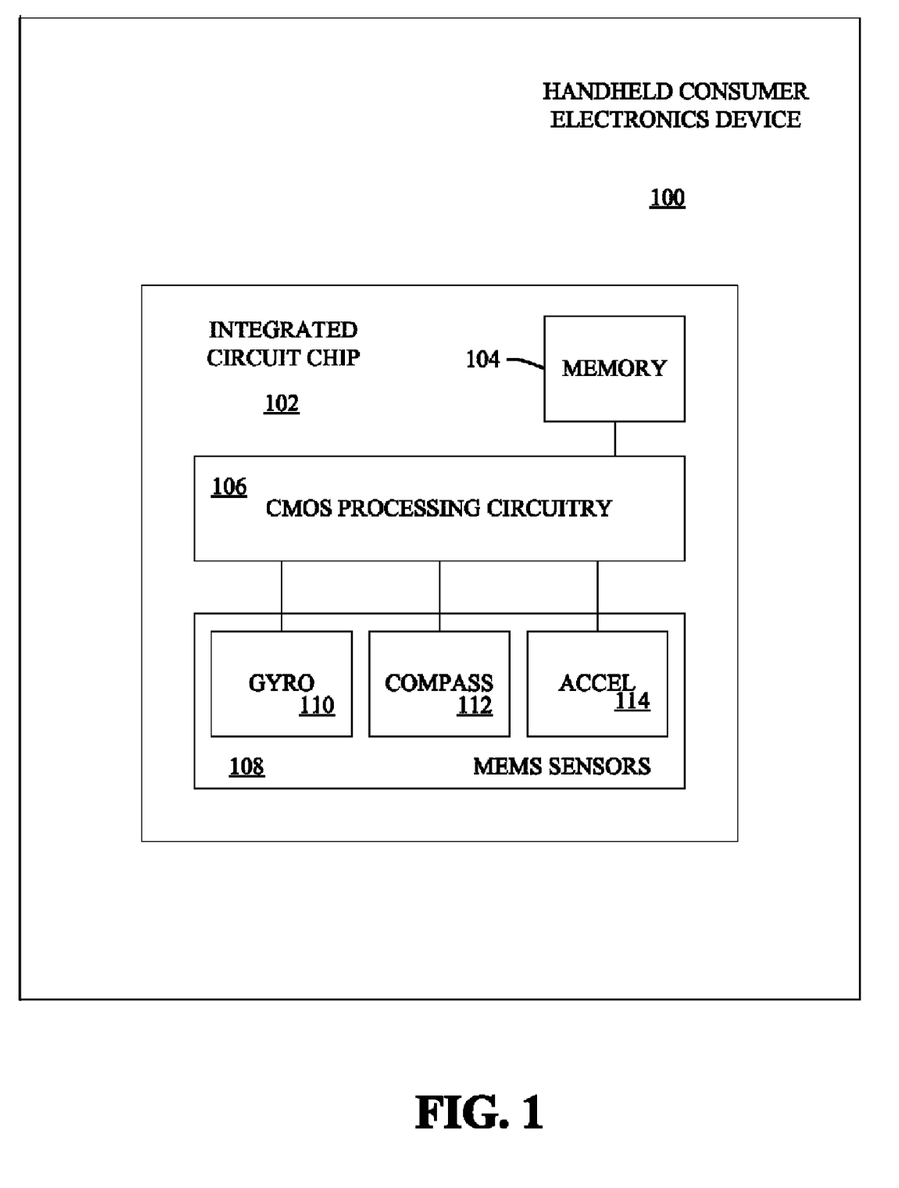
FIG. 1 illustrates an exemplary architecture of the present invention.
Figure 2:
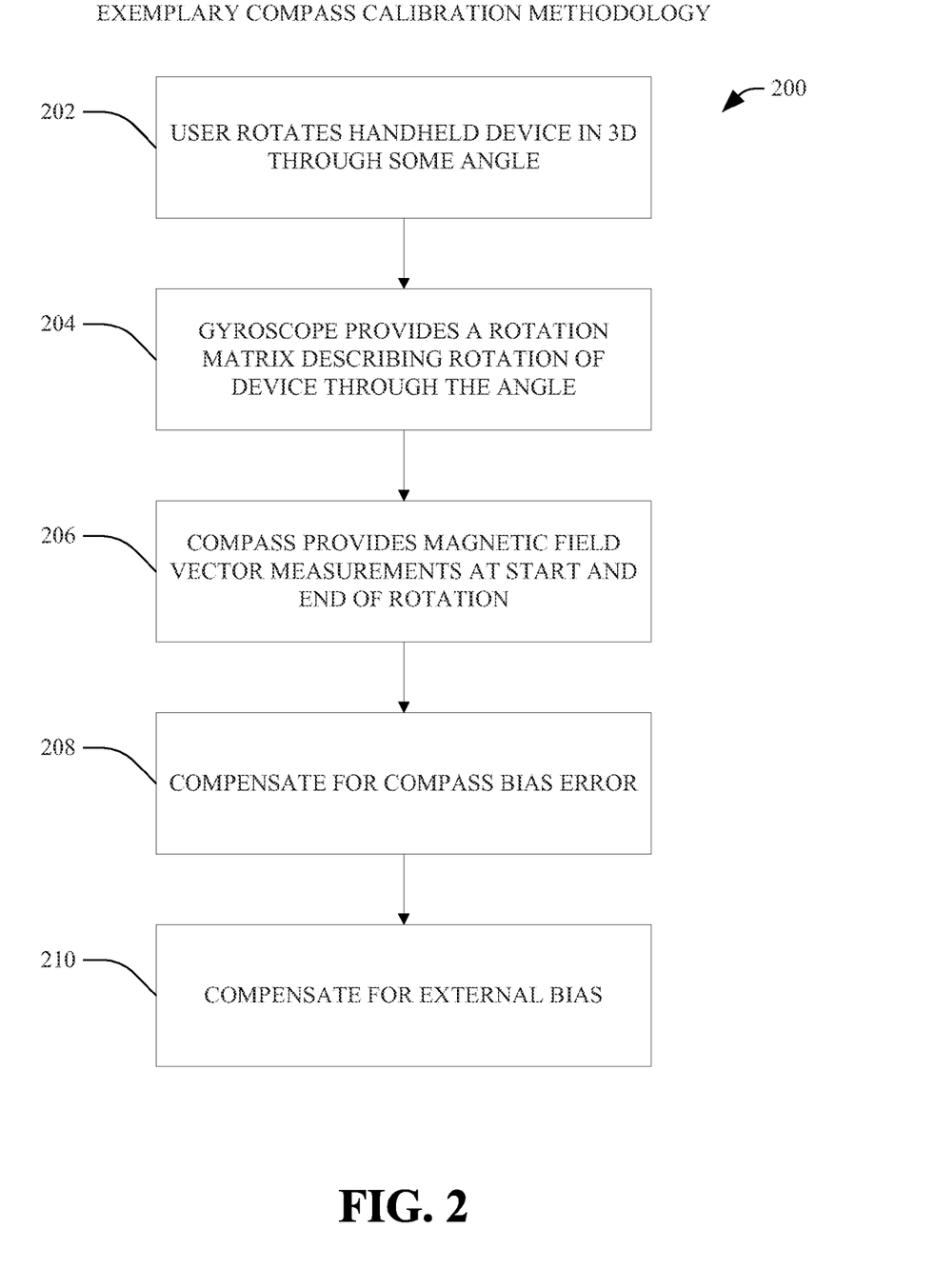
FIG. 2 illustrates an exemplary flow diagram for a methodology of the present invention for calibrating a compass.

An exemplary compass calibration technique 200 of the present invention is illustrated in FIG. 2. The Hall Effect is the production of a voltage difference (the Hall voltage) across an electrical conductor, transverse to an electric current in the conductor and a magnetic field perpendicular to the current. The Hall coefficient is defined as the ratio of the induced electric field to the product of the current density and the applied magnetic field. Hall Effect devices used in motion sensing can offer enhanced reliability in extreme environments.

When a gyroscope is present in the same handheld device as the compass, the gyroscope data can be compared with the compass data in order to speed up the compass calibration. If the device is rotated through some angle (Step 202), integrating the gyroscope data samples in three dimensions (3D) provides a rotation matrix R that describes the rotation of the device through that angle (integrated gyroscope angle) (Step 204). The handheld device can include one gyroscope (3-axis system), two gyroscopes (6-axis system) or three gyroscopes (9-axis system).

In linear algebra, a rotation matrix is any matrix that acts as a rotation in Euclidean space. In three dimensions, rotation matrices are used for computations in geometry, physics, and computer graphics. Integration of the gyroscope output can include periodically sampling the gyroscope output (i.e. angular rate) with an analog to digital converter, multiply the resulting number by the sample rate, and adding it to a static variable that keeps track of the angle of rotation.

The compass provides a measurement of the magnetic field vector at the start of the rotation, mprev, and another measurement at the end of the rotation, mfinal (Step 206). Magnetic vector refers to the amplitude and direction of the magnetic field associated with an electromagnetic wave. To calibrate a compass, any bias error identified with the magnetic field must be identified and corrected. Magnetic bias error refers to a steady magnetic field applied to a magnetic device. If the magnetic field vector of the compass has a bias error (mbias), it can be represented with the following equation:

$$R(m\text{prev}-m\text{bias})=m\text{final}-m\text{bias}$$

R is a rotation matrix derived by integrating the gyroscope data over a short period of time. Linear algebra techniques such as the least squares techniques can be used to solve the above equation for mbias. An advantage of using the gyroscope data is that the bias will converge, even if the device is only rotated through a very small angle. Convergence refers to approaching a finite limit or value. In many cases, the unconscious hand jitter of the user will be enough for the compass to calibrate. Moreover, even if a large movement is required for maximum accuracy, the initial calibration will be enough such that the compass can be used right away without requiring a figure-eight pattern movement.

At Step 208, the gyro and the compass data is used to estimate and compensate for the compass bias error. One of ordinary skill in the art would appreciate that the gyroscope/compass calibration technique of the present invention can be combined with the conventional compass only calibration method in order to increase the accuracy of the final compass parameters.

According to an aspect of the present invention, the scaling factor of the compass can also be calibrated. In this case, the pure compass calibration method solves the equation:

$$(A*X-X\text{bias})^2+(B*Y-Y\text{bias})^2+(C*Z-Z\text{bias})^2=M^2,$$

in which the scale factors A, B and C are the sensitivities. This is analogous to fitting compass data to an ellipsoid, rather than fitting it to a sphere.

In the gyroscopes/compass calibration, the equation being solved is:

$$R(S*m\text{prev}-m\text{bias})=S*m\text{final}-m\text{bias}, \text{ where * represents multiplication.}$$

In this case, the scale factor S comprises the three scale factors A, B and C for the X, Y, and Z elements of the compass respectively.

According to an aspect of the present invention, external biases are also compensated for (Step 210). Such external biases may come from fixed external magnetic fields from metal objects in the same handheld device as the compass. These external biases may be compensated for by using methods similar to the methods described above. For the pure compass calibration measurement, the external bias can be expressed as:

$$(A*X-X\text{bias})^2+(B*Y-Y\text{bias})^2+(C*Z-Z\text{bias})^2=(M-\text{ExternalBias})^2$$

For the gyro/compass calibration method, the external bias can be expressed as:

$$R(S*m\text{prev}-m\text{bias})=S*m\text{final}-m\text{bias}-\text{ExternalBias}$$

In one embodiment of the present invention, the compass can be calibrated using a linear feedback filter. In another embodiment of the present invention, the compass can be calibrated using a least squares algorithm or a Kalman filter. A Kalman filter is an efficient recursive filter that estimates the state of a linear dynamic system from a series of noisy measurements. Moreover, compasses are also responsive to large spikes in the magnetic field from wireless devices. In yet another embodiment of the present invention, these spikes can be removed with spike removal filters such as a median filter.

One of ordinary skill in the art would appreciate that the bandwidth required from a compass is usually very low (for e.g. 5 Hz) compared with that of a gyroscope (for e.g. 50 Hz). However, as the spikes from a radio frequency (RF) interference may be very short, and so low pass filtering the compass may cause the spikes to spread out and interfere with the compass data over a longer time scale. Therefore, according to an aspect of the present invention, the compass data is first obtained with a high bandwidth and a high sample rate, for example, a 50 Hz bandwidth and a 200 Hz sample rate. Spikes are removed from this data at the high rate using a median filter or other spike removal filter. The resulting data is than low pass filtered down to a lower rate, such as 5 Hz, and supplied to the user at a low sample rate, such as 10 Hz. This allows the user to use the compass at a reasonable, low rate, without interference from spikes from RF sources.

Gyroscope Calibration

In conventional systems that include an accelerometer, a compass and a gyroscope, any offset in the gyroscope data, which would ordinarily result in a continuous drift, will be compensated by the accelerometer in pitch and roll, and the compass in yaw. However, the conventional approach does not work in the presence of large external magnetic fields, linear accelerations and temperature changes when the compass and accelerometer data become unreliable. The present invention discloses techniques for obtaining the most accurate gyroscope bias data possible during the scenarios in which the compass and/or accelerometer data are unreliable, so that best estimate of orientation of the handheld device can be obtained.

When the accelerometer and compass data are reliable, the angular velocity of the system can be derived from the derivative of the quaternion estimate. This angular velocity has the offsets removed, as the compass and accelerometer measurements of roll, pitch, and yaw have no direct current (DC) error. However, this elimination of the offset error is instantaneous, and if at a future time the compass data is removed from the estimate due to magnetic interference etc., any existing gyro bias error will become apparent again, resulting in a continuous drift.

Figure 3A:
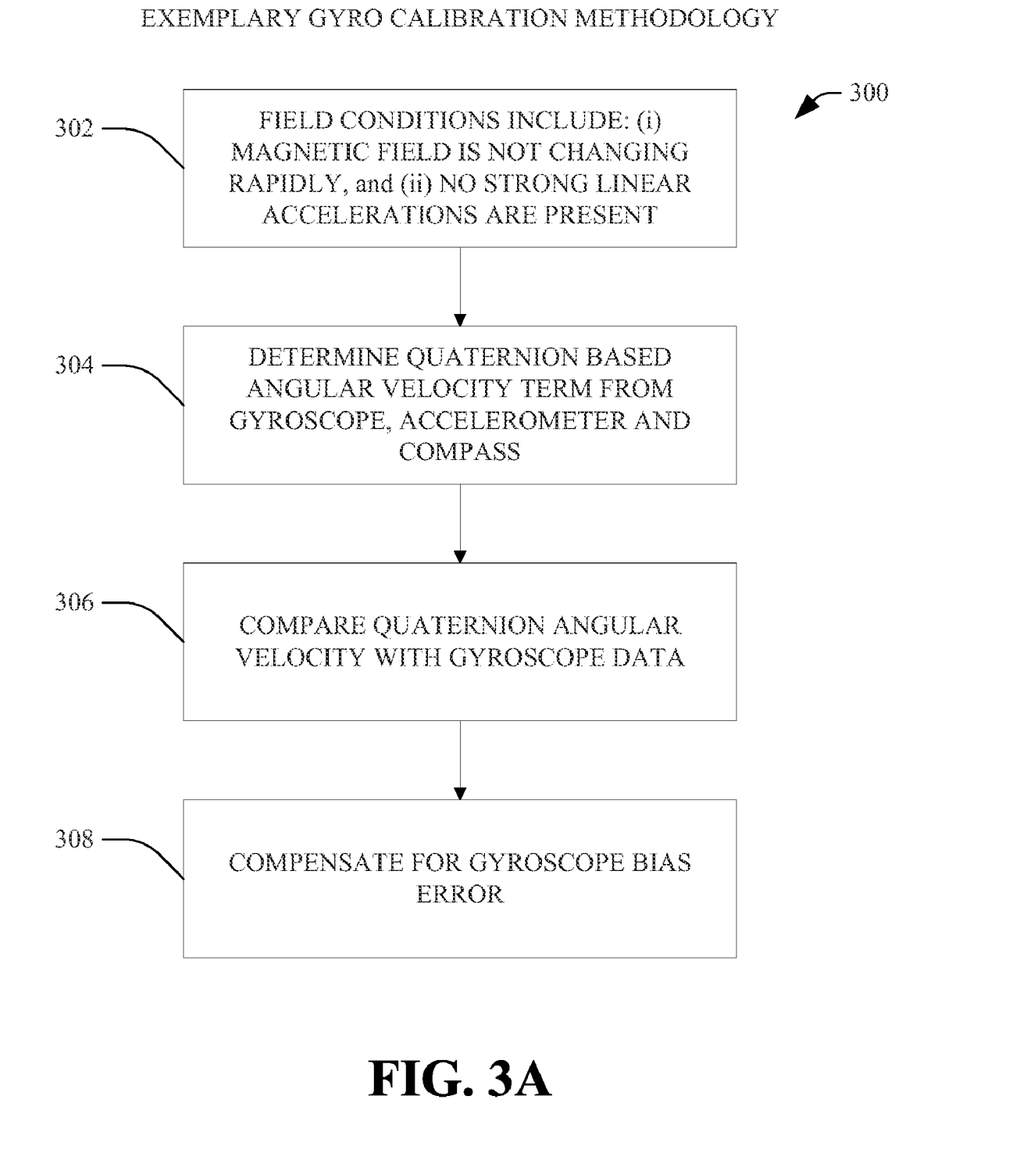
FIG. 3A illustrates an exemplary flow diagram for a methodology of the present invention for calibrating a gyroscope.

Therefore, according to an aspect of the present invention, as illustrated by the flow diagram 300 in FIG. 3A, when the compass and accelerometer data is valid Step 302), handheld device is moved either intentionally or unintentionally by the user and the quaternion-based angular velocity term is determined from the gyroscope, accelerometer and compass data (Step 304). The quaternion-based angular velocity term (QuaternionAngularVelocity) is used as a feedback term for estimating the gyroscope bias, by using the following equations (Step 306):

$$\text{GyroData}=\text{GyroData}-\text{GyroBias} \quad (i)$$

$$\text{GyroBias}=\text{GyroBias}+A*(\text{GyroData}-\text{QuaternionAngularVelocity}), \quad (ii)$$

wherein A is a time constant that determines the rate at which the gyroscope bias is adjusted, = represents equal to, − represents minus, + represents plus and * represents multiplication. According to equation (i), GyroData can be a static variable that represents the data received from the gyroscope. During integration of the gyroscope data, new data received from the gyroscope is added to GyroData. Also, the gyro bias (GyroBias) is removed from the GyroData value. According to equation (ii), GyroBias can be a static variable that represents the gyroscope bias. In equation (ii), the gyroscope data (GyroData) is compared with the quaternion based angular velocity (QuaternionAngularVelocity) to determine the gyroscope bias error.

During the gyroscope data integration, if the compass and the accelerometer data are reliable, the GyroBias value is updated by using the quaternion-based angular velocity term (QuaternionAngularVelocity). However, if the accelerometer and/or the compass data become unreliable, for example, because of the presence of a large external magnetic field or a large linear acceleration, the GyroBias is not updated until the compass and the accelerometer data become reliable again. Thus, according to an aspect of the present invention, a value of the quaternion based angular velocity term that is calculated when the compass and the accelerometer data are valid is stored in a memory location and used in equation (ii), in scenarios in which the compass data and/or the accelerometer data are unreliable. At Step 308, the gyroscope's estimated bias error is compensated for. The gyro bias error to be compensated is determined by using either the quaternion based angular velocity determined in real time (in a scenario in which the accelerometer and compass data are valid), or the quaternion based angular velocity stored in the memory (in a scenario in which the accelerometer and/or compass data are unreliable).

Figure 3B:
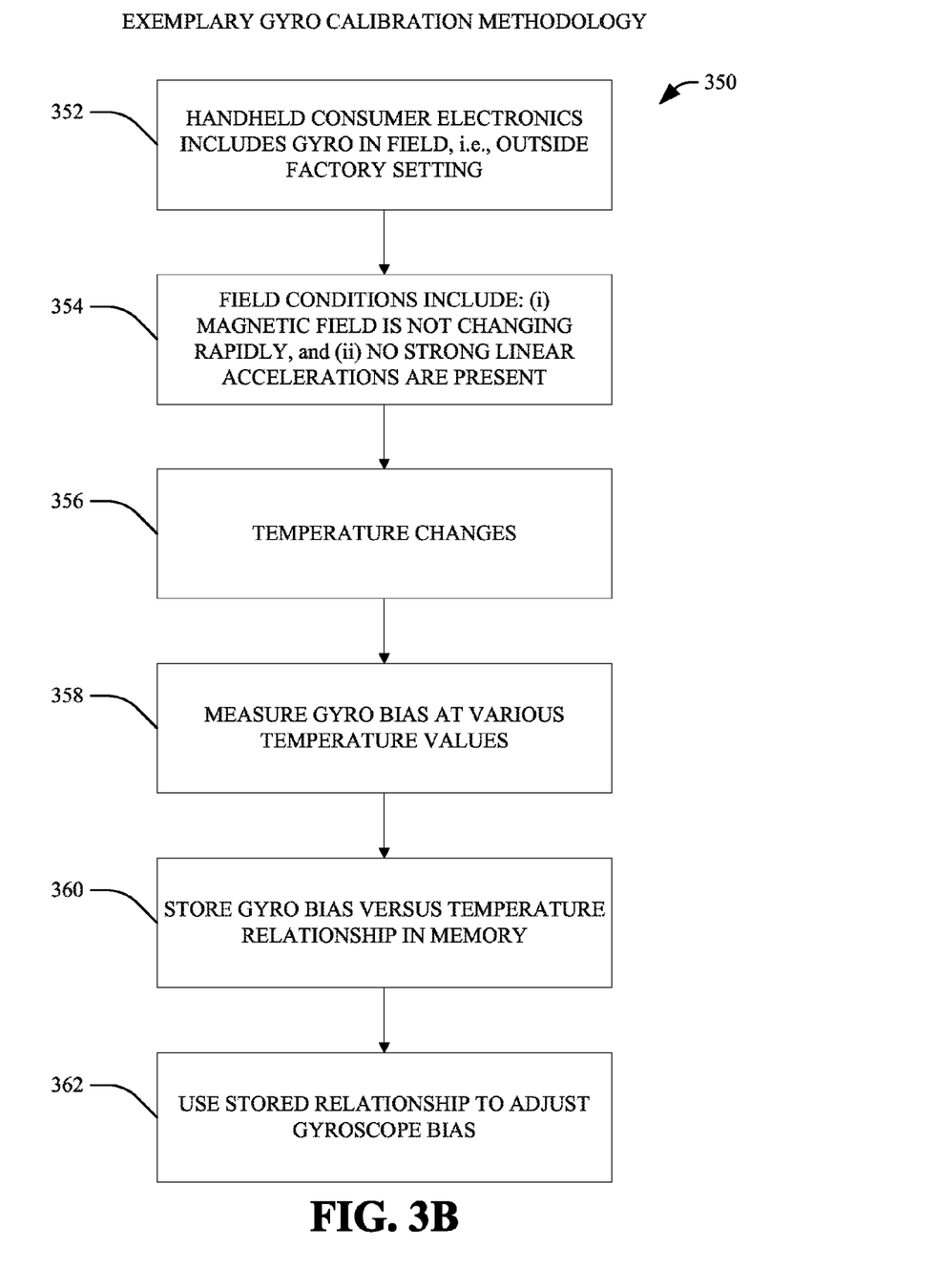
FIG. 3B illustrates another exemplary flow diagram for a methodology of the present invention for calibrating a gyroscope.
Figure 4:
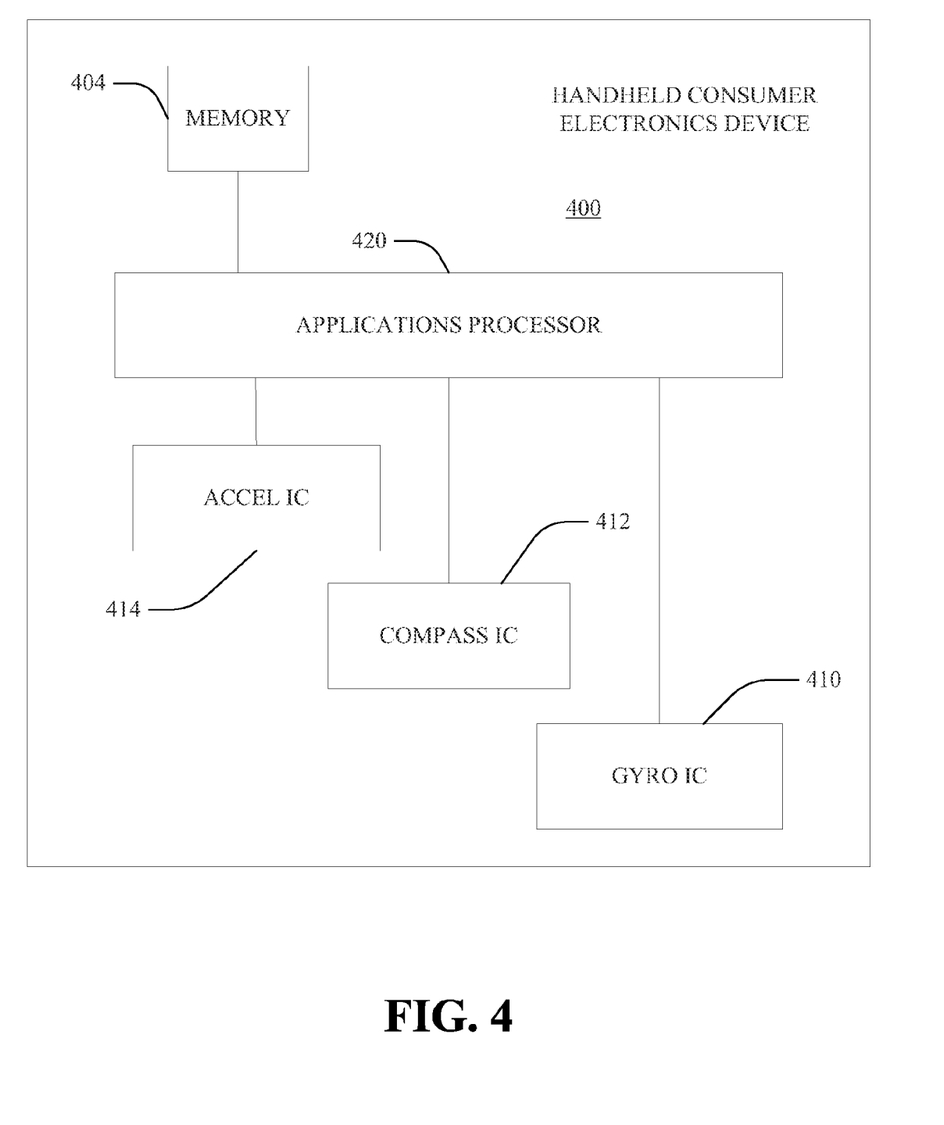
FIG. 4 illustrates an exemplary architecture of the present invention.

An exemplary gyroscope calibration technique (350) according to another aspect of the present invention is illustrated in FIG. 3B. Gyroscope biases depend on temperature and temperature compensation can provide an accurate bias estimation. The standard way to provide temperature compensation is to measure the bias in the factory while ramping up (or down) the temperature, and then store the resulting bias versus temperature function in a memory of the device. However, this procedure is expensive because it requires a long testing time while the temperature is controllably changed.

According to an aspect of the present invention, factory temperature compensation is not necessary (Step 352) because the presence of the accelerometer and the compass handheld devices can be used to determine the gyroscope bias. The temperature dependence can be learned over time when the gyroscope bias is known, which will be any time the external magnetic field is not changing rapidly and strong linear accelerations are not present (Step 354).

Under these conditions, the gyroscope bias and the temperature can be stored in a table (Steps 356 and 358). As more bias versus temperature points accumulate in the table, the resulting bias versus temperature function can be determined by doing a least squares or other curve fit to match the gyroscope versus temperature data to a line, polynomial, or other function (Step 360). At Step 362, the stored relationship is used to adjust the gyroscope bias. This stored relationship can be applied in a functional form or as a look-up table or piece-wise calibration function, reducing gyroscope bias errors when the accelerometer and/or compass data become unreliable.

For example, as the temperature increases by 5 Celsius degrees (5 C), the gyroscope bias will not change enough to impact an application, but this change will still be measurable. As new bias measurements are made using the various methods discussed above, the dependence of the gyroscope bias versus temperature can be modeled. Eventually, a slope (TempSlope) and offset (TempOffset) can be determined such that the gyroscope data (RawGyro) can be corrected (CorrectGyro) using:

CorrectGyro=RawGyro+TempSlope*TempSensor+ TempOffset.

Then, for example, as the temperature (TempSensor) increases by another 10 C., the values TempSlope and TempOffset can be used to provide more accurate gyroscope data.

According to an aspect of the present invention, when the gyroscope is stationary, the handheld device can heat itself and can calculate the temperature dependence during this self-heating. For example, when a hand-held device is charging its battery, the handheld device is typically stationary and heating. In this case, temperature compensation can occur. Alternatively, heating elements such as resistors can be placed on the board with the gyroscope, such that heating can occur when the system is stationary. Alternatively, other components can be used to generate heat. For example, processors that exist on the board with the gyroscope can be used as heaters by running code on them.

Compass Bias and Sensitivity Calibration

According to an aspect of the present invention, if the handheld device is rotated and the initial compass vector $X1=(x_1, y_1, z_1)^T$ becomes a new vector $X2=(x_2, y_2, z_2)^T$ after the rotation, the 3×3 rotation matrix R is obtained by using the gyroscope signal. The following equation describes the rotation, wherein dx is the bias of X-axis compass, dy and dz are the biases for the Y and the Z axis respectively, Sy is the scaling factor for the Y axis and Sz is the scaling factor for the Z axis (assuming Sx=1 for normalization purpose):

$$\begin{pmatrix} r_{11} & r_{12} & r_{13} \\ r_{21} & r_{22} & r_{23} \\ r_{31} & r_{32} & r_{33} \end{pmatrix} \begin{pmatrix} x_1 - dx \\ Sy * y_1 - dy \\ Sz * z_1 - dz \end{pmatrix} = \begin{pmatrix} x_2 - dx \\ Sy * y_2 - dy \\ Sz * z_2 - dz \end{pmatrix}$$

To calculate the compass bias (dx, dy, dz) and sensitivity (Sy, Sz), the equation is rearranged as follows:

$$\begin{pmatrix} 1-r_{11} & -r_{12} & -r_{13} & r_{12}y_1 & r_{13}z_1 \\ -r_{21} & 1-r_{22} & -r_{23} & r_{22}y_1 - y_2 & r_{23}z_1 \\ -r_{31} & -r_{32} & 1-r_{33} & r_{32}y_1 & r_{33}z_1 - z_2 \end{pmatrix} \begin{pmatrix} dx \\ dy \\ dz \\ Sy \\ Sz \end{pmatrix} = \begin{pmatrix} x_2 - r_{11}x_1 \\ -r_{21}x_1 \\ -r_{31}x_1 \end{pmatrix}$$

The above equation is a linear equation in the well known format AX=b, where AX represents A multiplied by X. The above equation represents one pair of sample points. With n pairs of samples, the dimension of the coefficient matrix A in the above linear system AX=b becomes 3n×5, and the offset b becomes 3n×1. Pre-multiplying the matrix transpose $A^T$ makes the equation become $A^T AX=A^T b=>A'X=b'$, where A' is a 5×5 matrix and b' is a 5×1 matrix. Linear system techniques can be applied to obtain compass bias and sensitivity.

Exemplary Networked and Distributed Environments

One of ordinary skill in the art can appreciate that the various embodiments of methods and devices for pointing based services and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 9:
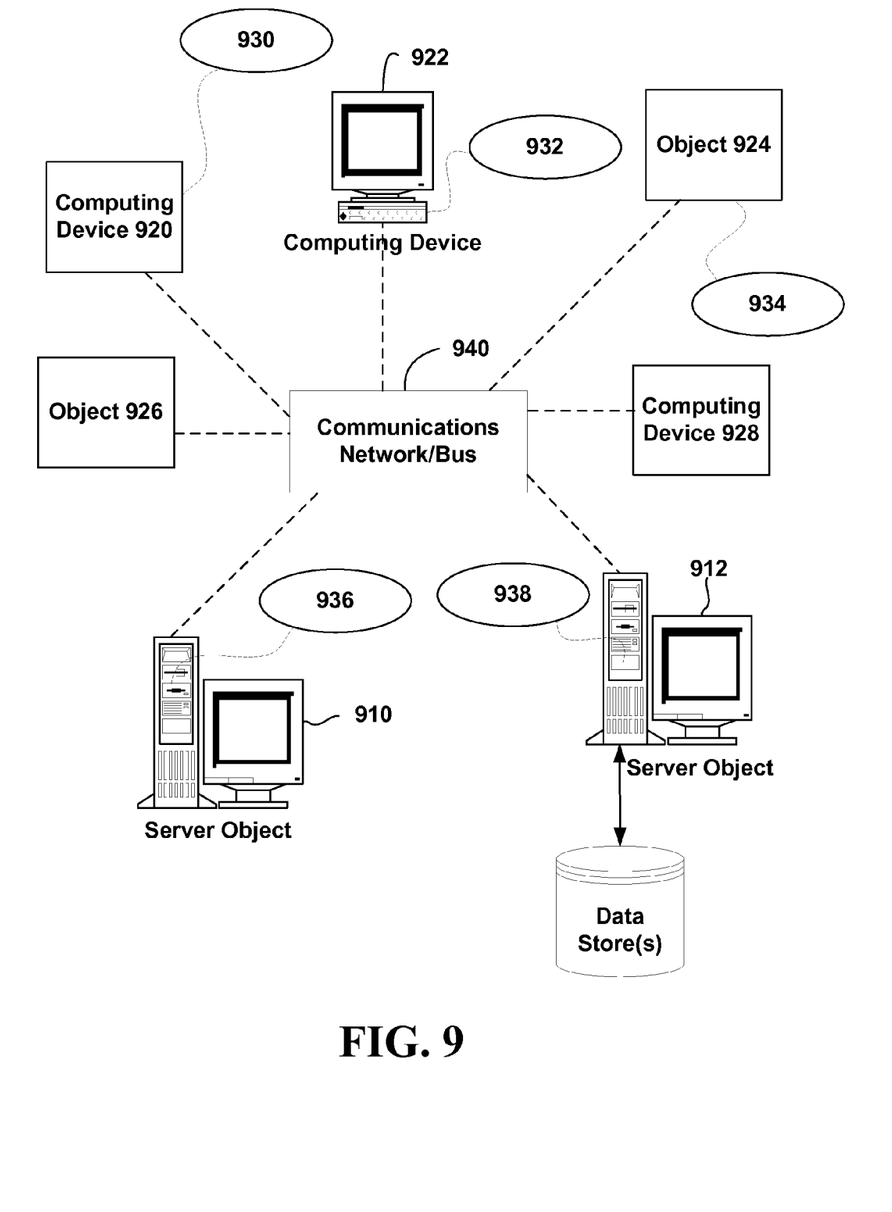
FIG. 9 illustrates an exemplary computer network in which the present invention can be implemented.

FIG. 9 provides a non-limiting schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that objects 910, 912, etc. and computing objects or devices 920, 922, 924, 926, 928, etc. may comprise different devices, such as remote controllers, PDAs, audio/video devices, mobile phones, MP3 players, laptops, etc.

Each object 910, 912, etc. and computing objects or devices 920, 922, 924, 926, 928, etc. can communicate with one or more other objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each object 910, 912, etc. or 920, 922, 924, 926, 928, etc. can also contain an application, such as applications 930, 932, 934, 936, 938, that might make use of an API, or other object, software, firmware and/or hardware, suitable for communication with or implementation of the delayed interaction model as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In client/server architecture, particularly a networked system, a client is usually a computer that accesses shared network resources provided by another computer, e.g., a server. In the illustration of FIG. 9, as a non-limiting example, computers 920, 922, 924, 926, 928, etc. can be thought of as clients and computers 910, 912, etc. can be thought of as servers where servers 910, 912, etc. provide data services, such as receiving data from client computers 920, 922, 924, 926, 928, etc., storing of data, processing of data, transmitting data to client computers 920, 922, 924, 926, 928, etc., although any computer can be considered a client, a server, or both, depending on the circumstances. Any of these computing devices may be processing data, or requesting services or tasks that may implicate the delayed interaction model and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the direction based services can be provided standalone, or distributed across multiple computing devices or objects.

In a network environment in which the communications network/bus 940 is the Internet, for example, the servers 910, 912, etc. can be Web servers with which the clients 920, 922, 924, 926, 928, etc. communicate via any of a number of known protocols, such as the hypertext transfer protocol (HTTP). Servers 910, 912, etc. may also serve as clients 920, 922, 924, 926, 928, etc., as may be characteristic of a distributed computing environment.

Exemplary Computing Device

As mentioned, various embodiments described herein apply to any device wherein it may be desirable to perform pointing based services, and delay interactions with points of interest. It should be understood, therefore, that handheld, portable and other computing devices and computing objects of all kinds are contemplated for use in connection with the various embodiments described herein, i.e., anywhere that a device may request pointing based services. Accordingly, the general purpose remote computer described below in FIG. 10 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 10:
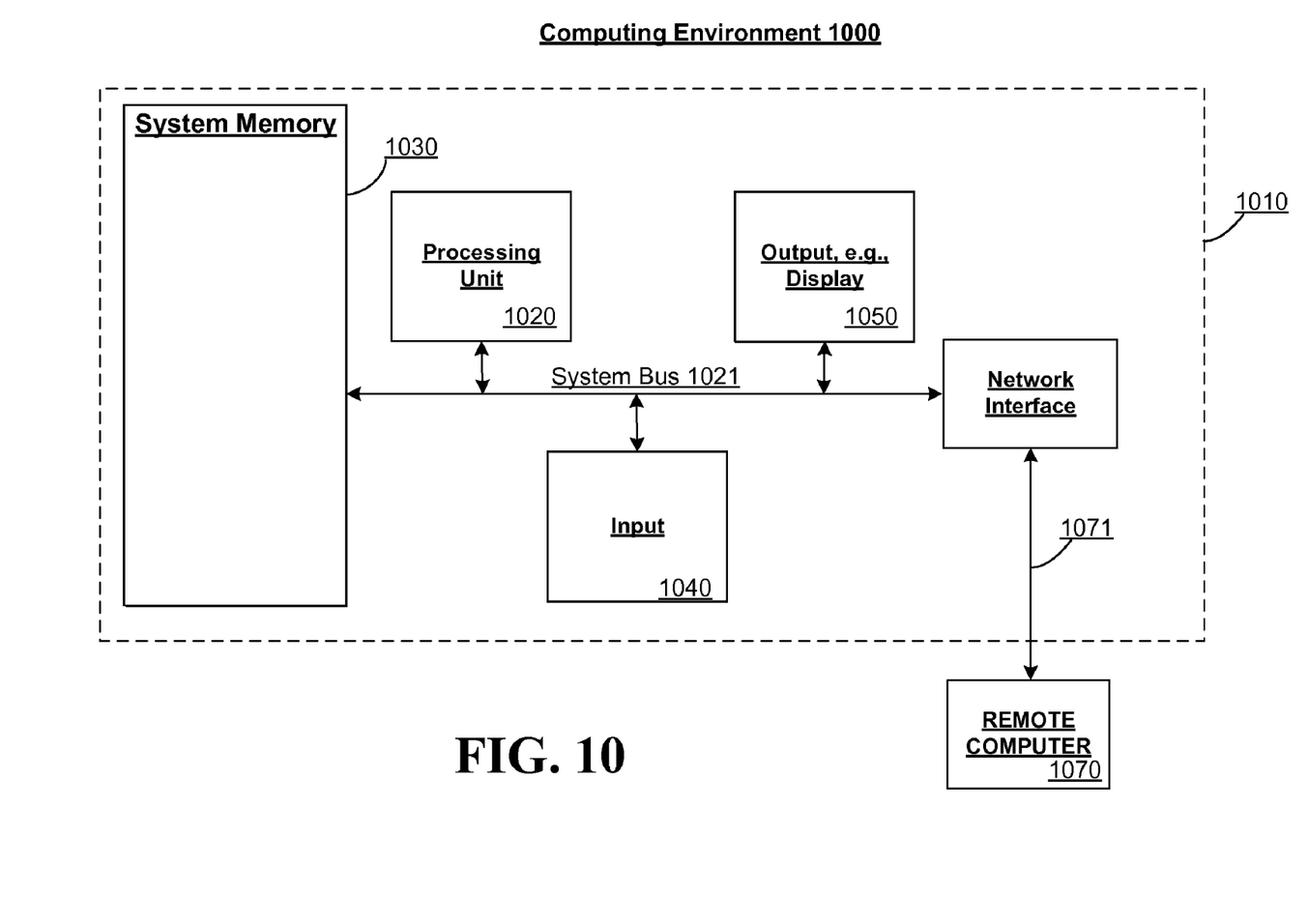
FIG. 10 illustrates an exemplary computing environment in which the present invention can be implemented.

FIG. 10 thus illustrates an example of a suitable computing system environment 1000 in which one or more of the embodiments may be implemented, although as made clear above, the computing system environment 1000 is only one example of a suitable computing environment and is not intended to suggest any limitation as to the scope of use or functionality of any of the embodiments. Neither should the computing environment 1000 be interpreted as having any dependency or requirement relating to any one or combination of components illustrated in the exemplary operating environment 1000.

With reference to FIG. 10, an exemplary remote device for implementing one or more embodiments herein can include a general purpose computing device in the form of a handheld computer 1010. Components of handheld computer 1010 may include, but are not limited to, a processing unit 1020, a system memory 1030, and a system bus 1021 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user may enter commands and information into the computer 1010 through input devices 1040. A monitor or other type of display device is also connected to the system bus 1021 via an interface, such as output interface 1050. In addition to a monitor, computers may also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1071, such as a local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to derive information about surrounding points of interest.

There are multiple ways of implementing one or more of the embodiments described herein, e.g., an appropriate API, tool kit, driver code, operating system, control, standalone or downloadable software object, etc. which enables applications and services to use the pointing based services. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method comprising:
   rotating a handheld device through an angle of rotation defined by an initial position of the handheld device and a final position of the handheld device;
   receiving rotation information from a three axis gyroscope;
   integrating the rotation information from the three axis gyroscope over the angle of rotation in three dimensions to provide a rotation matrix describing rotation of the handheld device through the angle of rotation;
   receiving a first magnetic vector information corresponding to the initial position of the handheld device and a second magnetic vector information corresponding to the final position of the handheld device from a three axis compass;
   identifying a bias error of the three axis compass by comparing the rotation matrix to the first magnetic vector information and the second magnetic vector information; and
   correcting the bias error of the three axis compass.

2. The method of claim 1, wherein the rotating further comprises rotating the handheld device through the angle of rotation due to an unintentional hand jitter.

3. The method of claim 1, wherein the bias error of the three axis compass is caused by a metal device, a magnetic field or a magnet external to the compass.

4. The method of claim 1, further comprising:
   adjusting sensitivity in three dimensions of the three axis compass.

5. The method of claim 1, further comprising:
   receiving rotation information from a three axis accelerometer corresponding to the rotation of the handheld device through the angle of rotation;
   determining a first angular velocity term for the handheld device by using rotation information received from the compass, the accelerometer and the gyroscope;
   comparing the rotation information received from the three axis gyroscope with the first angular velocity term; and using the result of the comparison to determine a bias of the three axis gyroscope.

6. The method of claim 5, wherein:
comparing the rotation information received from the three axis gyroscope with the first angular velocity term if the information received from the three axis accelerometer and the three axis compass is reliable; and
comparing the rotation information received from the three axis gyroscope with a second angular velocity term stored in a memory if the information received from the three axis accelerometer or the three axis compass is unreliable; wherein,
the second angular velocity term includes an angular velocity term that was determined when the information received from the three axis accelerometer and the three axis compass was reliable.

7. The method of claim 5, wherein the establishing further comprises modeling a temperature dependence of the gyroscope bias.

8. The method of claim 7, wherein the modeling further comprises determining a slope and an offset that are used to correct the gyroscope data and eliminate the gyroscope bias.

9. The method of claim 1, wherein the identifying further comprises representing the bias error with the following equation:

$$R(mprev-mbias)=mfinal-mbias,$$

where R is the rotation matrix, mprev is the first magnetic field vector information corresponding to the initial position of the handheld device, mfinal is the second magnetic vector information corresponding to the final position of the handheld device, and mbias is the compass bias error.

10. The method of claim 9, further comprising:
solving for mbias using a linear algebra technique; and
achieving a convergence of mbias.

11. A handheld consumer electronics device comprising:
a three axis gyroscope;
a three axis compass;
a memory that stores computer executable instructions; and
a processor that facilitates execution of the computer executable instructions to at least:
receive information from the three axis gyroscope related to a rotation of the handheld consumer electronic device through an angle of rotation from a first point to a second point and information from the three axis compass comprising a first magnetic vector corresponding to the first point of the angle of rotation and a second magnetic vector corresponding to the second point of the angle of rotation;
integrate the information from the three axis gyroscope over the angle of rotation in three dimensions to provide a rotation matrix describing the rotation; and
identify a bias error of the three axis compass by a comparison of the rotation matrix to the first magnetic vector and the second magnetic vector.

12. The handheld consumer electronics device of claim 11, further comprising:
an accelerometer,
wherein the processor further facilitates the execution of the computer executable instructions to:
receive rotation information from the three axis accelerometer; and
determine a first angular velocity term for the handheld device by using rotation information received from the three axis compass, the three axis accelerometer and the three axis gyroscope;
compare the information received from the three axis gyroscope with the first angular velocity term; and
use the result of the comparison to determine a gyroscope bias for the three axes.

13. The handheld consumer electronics device of claim 12, wherein the processor further facilitates the execution of the computer executable instructions to:
compare the information received from the three axis gyroscope with the first angular velocity term if the information received from the three axis accelerometer and the three axis compass is reliable; and
compare the information received from the gyroscope with a second angular velocity term stored in a memory if the information received from the three axis accelerometer or the three axis compass is unreliable,
wherein the second angular velocity term includes an angular velocity term determined when the information received from the three axis accelerometer and the three axis compass are reliable.

14. The handheld consumer electronics device of claim 11, wherein the processor further facilitates the execution of the computer executable instructions to:
adjust a three dimensional compass sensitivity value based on the bias of the three axis compass.

15. The handheld consumer electronics device of claim 11, further comprising:
a measurement circuit for measuring gyroscope biases at various temperature values, wherein
the memory stores the measurements and temperature values in a table, and
the processor further facilitates the execution of the computer executable instructions to use the table to estimate the gyroscope bias when the three axis compass data or the three axis accelerometer data is unreliable.

16. The handheld consumer electronics device of claim 11, wherein the handheld computer electronics device facilitates display of a position of a user in real time.

17. The handheld consumer electronics device of claim 12, wherein the handheld computer electronics device facilitates input of a signature based on a trajectory of movement of the handheld computer electronics device.

18. The handheld consumer electronics device of claim 17, further comprising a library of signatures stored in the memory,
wherein the processor facilitates the execution of the computer executable instructions to authenticate a signature of the user.

19. The handheld consumer electronics device of claim 11, wherein the processor is further configured to facilitate the execution of the computer executable instructions to identify the bias error of the three axis compass with the following equation:

$$R(mprev-mbias)=mfinal-mbias,$$

where R is the rotation matrix, mprev is the first magnetic field vector information corresponding to the first position of the handheld device, mfinal is the second magnetic vector information corresponding to the second position of the handheld device, and mbias is the compass bias error.

* * * * *